(12) United States Patent
Albertelli et al.

(10) Patent No.: US 11,590,715 B2
(45) Date of Patent: Feb. 28, 2023

(54) PATTERNED COMPOSITE PRODUCT

(71) Applicant: Acell Industries Limited, Greater London (GB)

(72) Inventors: Aldino Albertelli, Dublin (IE); Michael Frieh, Dublin (IE)

(73) Assignee: Acell Industries Limited, County Cork (IE)

( * ) Notice: Subject to any disclaimer, the term of this patent is extended or adjusted under 35 U.S.C. 154(b) by 517 days.

(21) Appl. No.: 16/653,068

(22) Filed: Oct. 15, 2019

(65) Prior Publication Data

US 2020/0147941 A1   May 14, 2020

Related U.S. Application Data

(63) Continuation of application No. 13/124,799, filed as application No. PCT/GB2009/051413 on Oct. 20, 2009, now Pat. No. 10,479,054.

(30) Foreign Application Priority Data

Oct. 20, 2008   (GB) .................................... 0819210

(51) Int. Cl.
| | |
|---|---|
| *B29C 70/46* | (2006.01) |
| *B32B 27/06* | (2006.01) |
| *B32B 27/12* | (2006.01) |
| *B29C 70/78* | (2006.01) |
| *B44C 5/04* | (2006.01) |

(Continued)

(52) U.S. Cl.
CPC ............ *B29C 70/46* (2013.01); *B29C 70/086* (2013.01); *B29C 70/78* (2013.01); *B32B 27/065* (2013.01); *B32B 27/12* (2013.01); *B44C 5/0453* (2013.01); *B29K 2105/043* (2013.01); *B32B 2266/06* (2013.01); *B32B 2305/022* (2013.01); *B32B 2305/20* (2013.01); *B32B 2305/72* (2013.01);
(Continued)

(58) Field of Classification Search
CPC .. B32B 27/065; B32B 27/12; B32B 2305/022
USPC ....................................................... 428/195.1
See application file for complete search history.

(56) References Cited

U.S. PATENT DOCUMENTS

| | | |
|---|---|---|
| 2,694,028 A | 11/1954 | Rapp |
| 3,101,994 A | 8/1963 | Ludwig et al. |

(Continued)

FOREIGN PATENT DOCUMENTS

| | | |
|---|---|---|
| DE | 19814039 A1 | 10/1999 |
| DE | 10234018 A1 | 2/2004 |

(Continued)

OTHER PUBLICATIONS

International Search Report dated Mar. 22, 2010, Application No. PCT /GB2009/051413.

(Continued)

*Primary Examiner* — Betelhem Shewareged
(74) *Attorney, Agent, or Firm* — Ryan T. Grace; Advent, LLP

(57) ABSTRACT

The present invention relates to methods for forming a composite product having a patterned surface. A substrate including a porous structure (136), a sheet-form material (134) and a patterned sheet (131) are pressed together to form the composite product. In preferred examples, the patterned sheet is permeable to curable material in the sheet-form material.

19 Claims, 2 Drawing Sheets

Figure 1A:
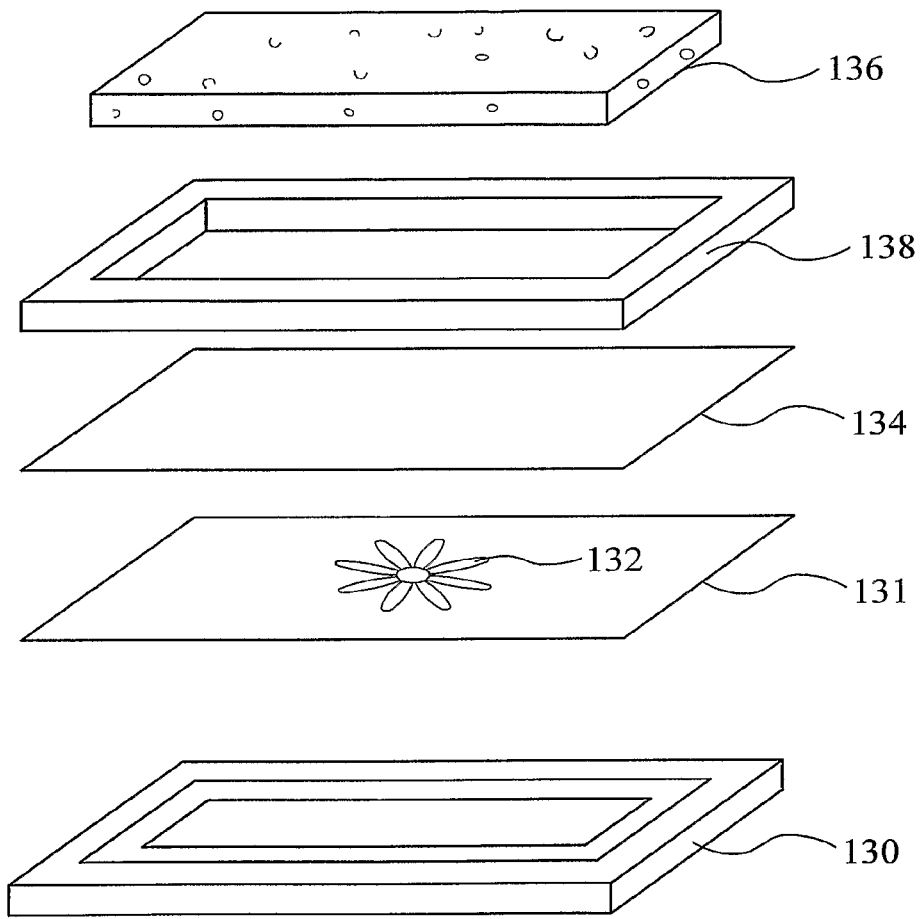

(51) Int. Cl.
  *B29C 70/08* (2006.01)
  *B29K 105/04* (2006.01)
(52) U.S. Cl.
  CPC ... *B32B 2315/085* (2013.01); *Y10T 156/1041* (2015.01); *Y10T 428/2481* (2015.01)

(56) References Cited

U.S. PATENT DOCUMENTS

| | | |
|---|---|---|
| 4,034,137 A | 7/1977 | Hofer |
| 4,753,837 A | 6/1988 | Hanusa |
| 4,764,238 A | 8/1988 | Dastin et al. |
| 5,007,976 A | 4/1991 | Satterfield et al. |
| 5,251,414 A | 10/1993 | Duke |
| 6,235,806 B1 | 5/2001 | Ohga et al. |
| 6,551,694 B1 | 4/2003 | Imamichi et al. |
| 2003/0121585 A1 | 7/2003 | Kukoff |
| 2004/0265567 A1 | 12/2004 | Janzen |
| 2005/0255249 A1 | 11/2005 | Schlatterbeck et al. |
| 2006/0070347 A1 | 4/2006 | Gupta et al. |
| 2007/0054107 A1 | 3/2007 | Hammond et al. |
| 2007/0264475 A1 | 11/2007 | Strauss |

FOREIGN PATENT DOCUMENTS

| | | | |
|---|---|---|---|
| DE | 202007010693 U1 | 11/2007 | |
| EP | 0010353 A1 | 4/1980 | |
| EP | 1595718 A1 | 11/2005 | |
| EP | 1679169 A1 | 7/2006 | |
| EP | 1842652 A1 | 10/2007 | |
| GB | 1177483 A | 1/1970 | |
| GB | 1214873 A | 12/1970 | |
| GB | 1323425 A | 7/1973 | |
| GB | 1539631 A | 1/1979 | |
| GB | 2214867 A | 9/1989 | |
| GB | 2453308 A | 4/2009 | |
| JP | 2004291360 A | 10/2004 | |
| WO | 9710950 A1 | 3/1997 | |
| WO | WO 99/50341 * | 3/1999 | ............ C08J 5/04 |
| WO | WO 99/35364 * | 7/1999 | ............ E06B 3/70 |
| WO | 9950341 A1 | 10/1999 | |
| WO | 2009044169 A2 | 4/2009 | |

OTHER PUBLICATIONS

UKIPO Search Report dated Oct. 5, 2009, Application No. GB0819210.6.

* cited by examiner

PATTERNED COMPOSITE PRODUCT

This invention relates to composite products, for example laminate products. Preferred aspects of the invention relate to laminates comprising a foam substrate and a skin on a surface of the substrate. Other aspects of the invention comprise a skin which may be attached to a substrate. Preferred aspects of the invention relate to the production of laminated panels, for example for use in building, in furniture and as architectural components, for example architectural mouldings, although the invention has wide application to a broad range of composite products. Aspects of the invention described relate to doors, windows and other panels, in particular those used in buildings and in furniture.

Panels and other elements used in building have traditionally been made of natural materials. For example, doors and panels for buildings and furniture have traditionally been made from wood. However, there is trend for building elements and other products which would traditionally used natural products to be made from "non-natural" or synthetic products, for example plastics materials. Such modern materials have many chemical, physical and cost advantages compared with traditional materials. Foam resin laminate panels of the kind comprising a foam resin layer and a skin are being employed increasingly in the building, decorating and furniture industries because of the wide range of useful properties achievable.

Such modern materials have a different appearance from the traditional materials, and attempt is often made so that the artificial product resemble closely the appearance of the traditional product, for example by the application of surface coatings and/or treatments. In such cases, and in other arrangements there is a desire for composite products having a pattern on their exterior surfaces. Such a pattern may be used to assist in mimicking of the traditional or other material, or may comprise a pattern, picture or other image or graphic on the surface.

In known methods, such image or graphic might be applied after the object has been formed, for example by application of the image or graphic onto the surface, for example by applying an adhesive film bearing the image or graphic onto the surface. Alternatively or in addition, images or graphics might be printed onto the surface after formation of the object. However, such applied images can be subject to damage during use, and can also be costly and time consuming to apply.

An object of aspects of the present invention is to solve or mitigate the above identified problems and/or other problems and/or to provide an improved composite product and method of forming a composite product.

According to an aspect of the invention there is provided a method of forming a composite product having a patterned surface, the method comprising: providing a substrate including a porous structure, a sheet-form curable material, and a patterned sheet; the method including the step of applying the sheet-form curable material and the patterned sheet to a surface of the substrate, and applying pressure to press the patterned sheet and the sheet-form curable material to the substrate to form the composite product, during the pressing a component of the sheet-form curable material passing into a surface of the substrate and also into a surface of the patterned sheet.

Preferably at least a part of the pattern of the patterned sheet is visible at an external surface of the composite product.

Preferably the patterned sheet is permeable in respect of at least a component of the sheet-form material. Preferably it is permeable in respect of a curable component of the material. In this way, an improved bond with the patterned sheet is possible. Preferably the curable material permeates fully into the patterned sheet.

Preferably the sheet-form material extends at least substantially across the whole surface of the patterned sheet. Preferably the sheet-form material extends substantially across the whole of a surface of the product.

In this way, where the pressing is carried out in a mould, the movement of the materials in the plane of the mould surface can be reduced. This is particularly of importance in many examples of the invention, for example where the patterned sheet Includes a woven or non-woven fabric material. It has been found that where material moves in the plane of the mould during moulding, the patterned sheet can be damaged, torn or completely destroyed. In prior methods of moulding using SMC, the SMC was applied in the mould in several spaced-apart regions, flowing of the SMC in the mould leading to the desired product.

Preferably, the sheet includes woven or non-woven fibrous material which is permeable to a curable material According to an aspect of the invention, there is provided a method of forming a composite product having a patterned surface, the method comprising: providing a substrate including a porous structure, a sheet-form material, and a patterned sheet; the method including the step of applying the sheet-form material and the patterned sheet to a surface of the substrate, and applying pressure to press the patterned sheet and the sheet-form moulding material to the substrate to form the composite product.

In this way, the substrate, sheet-material and the patterned sheet can become bonded together to form a composite product having a patterned surface.

The sheet-form material is preferably applied between the substrate and the patterned sheet. In this way, the patterned sheet can be provided at or near an outer surface of the composite product, which may be a requirement for the pattern to be visible.

Preferably the application of pressure is carried out in a mould, the method including the step of providing the patterned sheet between the sheet-form material and a surface of the mould.

Preferably the patterned sheet is substantially pervious to a component of the sheet-form material during the step of application of pressure. In this way, improved bonding of the patterned sheet in the composite product can be obtained.

Preferably the sheet-form material comprises a curable material, the method including the step of causing or allowing the material to cure. Preferably cure occurs during the pressing step. In some examples, some or all of the curing may occur after the pressing step. Preferably curable material flows into the patterned sheet during the pressing step.

Preferably at least some part of the material of the sheet-form material flows into a surface of the patterned sheet during pressing. Preferably the curable material is a curable plastics material, preferably a thermosetting material.

In this way, the material becomes keyed into the patterned sheet, thus improving the bond between the patterned sheet and the substrate.

Preferably the curable material is keyed into the patterned sheet in the composite. In this way, a strong bond with the patterned sheet can be obtained. The risk of removal or peeling of the patterned sheet from the composite product in use is therefore reduced.

Preferably curable material penetrates substantially through the whole thickness of the patterned sheet in the pressing step. Preferably the pressing step forces material of the sheet-from material into the full thickness of the patterned sheet. The patterned sheet can become bonded into the surface of the cured composition. This can be particularly advantageous as the cured material can protect the pattern from damage in the composite product. Also the cured material can form a desirable surface finish.

Not all of the curable material might originate from the sheet-form material.

In some arrangements, it is envisaged that a further layer of material, for example including a curable material might be applied between the mould surface and the patterned sheet before moulding. In such a case material from this further layer may flow into the patterned sheet in addition to or in the place of material from the sheet-form material. In each case, the patterned sheet is substantially encapsulated in the surface of the resulting composite product, preferably within a cured resin.

In some arrangements the patterned sheet can be placed directly adjacent to the mould surface and there will be sufficient penetration by the curable components for a satisfactory surface finish to be produced. However, it is envisaged that a further layer may be provided between the veil and the mould surface to improve the surface finish. For example a layer of resin material may be provided on the surface of the mould. This may be applied by any appropriate method.

Alternatively, or in addition, the printed sheet layer may comprise additional components, for example resin material to improve surface finish.

The patterned sheet may extend over substantially all or only a part of the sheet-form material and/or the substrate area. For example, a pattern might only be applied to a part of the composite product. In such a case, the patterned sheet might only be applied in that part or parts, or a larger patterned sheet might be applied, carrying a pattern only in one or more regions of the patterned sheet.

Preferably the printed sheet material is sufficiently pervious to the curable material.

The printed sheet material may comprise any suitable material or fabric. Preferably the printed sheet material comprises a fibrous material. The material may comprise long and/or short fibres and may be a woven or non-woven material or fabric. While in some arrangements, the printed sheet material is substantially opaque, preferably, the sheet is translucent or at least partly transparent. The sheet may comprise a veil material.

Preferably, any coating or layer applied between the printed sheet and the mould surface is substantially transparent or translucent in the resulting product that the pattern on the veil is visible through that coating or layer.

The sheet may comprise a non-woven material. In particular where the sheet is applied directly to the mould, it may be desired for the sheet material not to have a particular texture or finish, which might form a perceptible surface structure at the surface of the moulded product. However, in other arrangements, such a surface structure or pattern at the surface may be an advantageous feature. Such a feature may be provided by choice of a suitable woven or other structure for part or all of the sheet.

Where such a structure is not desired, preferably the printed sheet comprises a non-woven material. For example, preferably the printed sheet does not comprise a knitted or woven surface, although in some cases such a material could be used, in particular if a surface treatment had been provided to reduce the surface structure of the sheet material. For example, in some arrangements, the sheet might comprise a fleece or brushed surface. However, for most applications, preferably at least one surface of the sheet material has substantially no surface structure or pattern.

The sheet may comprise a felt cloth. For example the sheet may comprise a polyester material. Alternative materials could be used, for example comprising wool, polyethylene, polypropylene or PET. The sheet might comprise a fleece material, or might comprise a foam material. As indicated above, a suitable material preferably is pervious to the resin to be used, and has a suitable surface texture.

In preferred arrangements, the sheet material comprises a non-woven fibre material for example glass or carbon fibres. The sheet material may include one or more fibre materials and may additionally include other components, for example matrix materials or binders.

The patterned sheet may comprise a glass veil.

Such materials are well known and generally comprise a substantially uniform non-woven glass fibres in binders. Such materials have been found to be particularly advantageous in methods of the invention.

The patterned sheet may have a weight of less than 200 g/m2, preferably less than 150 g/m2. The weight of the veil may be 100 g/m2 or less, for example 50 g/m2 or less.

The patterned sheet is preferably a printed sheet. At least part of the pattern on the sheet may have been applied using one or more printing techniques, including screen printing, offset printing, inkjet printing or any other appropriate method.

Preferably, where ink forms a part of the pattern, the ink is a solvent-based ink, or a curable ink. For example the ink may comprise UV-curable ink. Preferably the ink is not water soluble. Preferably the ink or other material forming the pattern is stable at the moulding temperatures used, for example over 100 degrees C.

Preferably the patterned sheet is arranged prior to pressing so that the printed surface faces outwards, that is away from the substrate, although it is envisaged that in other arrangements the printed surface may face the substrate. In some examples, both surfaces of the patterned sheet may be printed.

Preferably the sheet-form material is arranged to such that the material is substantially continuous across a surface of the patterned sheet.

In prior techniques, sheet-form material would be applied to separate regions in the mould, the material spreading in the plane of the sheet to join the regions and form a continuous sheet. However, it has been identified that such movement of the material in the plane of the mould surface is likely to damage or destroy the printed sheet. By arranging for the sheet-form material to extend across the surface of the patterned sheet, movement in the plane of the mould can be reduced, or essentially eliminated.

Preferably the sheet-form material is arranged to extend across substantially all of a surface of the patterned sheet.

Where the pressing is carried out in the mould, preferably the sheet-form material, for example SMC extends substantially continuously across the whole mould surface.

In some examples, the sheet-form material will extend across the patterned sheet as a single layer, or multiple layers. The sheet-form material may include several sheet elements which join together to form a larger sheet. There may or may not be an overlap region where the sheet elements join.

The invention also provides a method of preparing patterned sheet for use in forming a patterned panel, the method including: preparing an image; printing at least a part of the image onto a surface of a sheet to form the pattern.

It has been found that good results are obtained where the pattern is printed onto the sheet, for example using an inkjet printer. The printing ink may be any appropriate composition. It may include a solvent-based or water-based ink. The ink may include a curable ink.

Preparing an image preferably includes preparing image data.

Preferably the images are printed using a digital printer. In this way, fast change-over of images can be provided, for example where printing a set of sheets including different images.

For example a designer may prepare a CAD image which is subsequently printed onto a sheet material for forming the composite product. The image data may be transmitted from the designer to the printer.

The method may include the step of cutting the printed sheet. The printed sheet may be trimmed to size, and/or more than one image for different panels may be printed onto the same sheet. It is envisaged that the images could be printed onto a long length of sheet, for example wound from a roll of material.

The method may further include using the sheet in the forming of a composite product. The pattern on the sheet for forming the panel may only be a part of a larger image. For example, where the image is to be applied to cupboard doors, the method may include the steps of making a set of doors, each door being or including a composite product as made using a method described. A different pattern may be applied to each door, so that when the doors are hung as a set on the cupboard(s), a larger image comprising the different patterns of the individual doors is formed. For example, a row of kitchen cupboards could have text or an image extending along the length of a row of cupboard doors. Several panels each including a pattern could be mounted together to form a larger image, for example a photograph of picture. The pattern might be in the form of a pattern, for example a woodgrain or stone pattern. By changing the image to be applied to elements of a set of panels, more realistic variation in the grain pattern can be achieved over the surface of the patterned product. For example, composite panels formed using methods described herein can be used as internal or external walls of a house or other building. It is envisaged that internal wall panels may be patterned, for example to give the effect of wallpaper or a paint effect. Exterior walls may be patterned for example to have a wood or stone effect.

Other features may be applied, for example visual effects, for example trompe l'oeil effects can be obtained. For example, a patterned sheet having the image of a paneled wood door can be applied to form a flat door having the visual effect of a paneled door. Architectural or other features can also be effected on panels to achieve other trompe l'oeil effects.

Thus the pattern on the sheet may be a part of a larger image.

The invention also provides a set of patterned sheets, each pattern of the set forming a part of a larger image.

Also provided is a set of printed sheets each sheet comprising woven or non-woven fibrous material and having a pattern printed onto its surface, the sheets being for application to a substrate to form a set of patterned composite products, wherein the set includes at least two different patterns on the sheets.

It will be appreciated that the composite product may comprise the door or panel itself, and/or may be applied as a skin to another substrate. Some or all of the composite substrate may be removed after manufacture of the composite product.

For example, patterned composite panels can optionally have some or all of the substrate removed, and then the patterned skin can be applied to the surface of an existing cupboard door, for example, and/or form a replacement door for a cupboard.

Where reference is made to a patterned sheet, preferably the term includes any pattern for example and image and/or text and/or graphic on or within part or all of the sheet. The pattern may include one or more repeating patterns and/or one or more individual images or other material. The pattern may include an image of a traditional product surface, for example a wood grain or brick pattern.

Usually it is envisaged that the invention will find application where the pattern is a visible one, but in some cases the pattern might not be visible to the naked eye. For example, the pattern might be detectable in another way, for example using UV radiation or an appropriate detector device.

The method may include the step of applying the patterned sheet directly to a surface of a mould. In other examples, one or more further layers might be applied between the sheet and the tool surface itself. In some examples, materials might be applied to the tool surface, for example to assist moulding and/or release of the product from the mould. In some arrangements, a resin or moulding layer might be applied between the printed sheet and the mould surface. This layer may be a wet, for example liquid resin composition, or dry, for example SMC or a pre-preg sheet.

A coating composition may be applied to the mould which forms a coating on the product after moulding. The composition may be coloured. The composition may be applied to the mould in the form of a powder, for example using an electrostatic method.

The sheet form material preferably includes one or more thermosetting materials. The material may include further components, for example components to enable the material to be handled in sheet-form.

The sheet-form material of aspects of the invention, may include any appropriate matrix composition. For example, the matrix may include one or more of a thermosetting polymer, for example an epoxy resin, a phenolic resin, a bismaleimide or polyimide, and/or any other suitable material. The material may include melamine, which is useful as a fire retardant. The matrix materials may further include hardeners, accelerators, fillers, pigments, and/or any other components as required. The matrix may include a thermoplastic material.

The sheet-form material may comprise reinforcement, for example reinforcing fibres. The sheet-form material may include glass fibres.

The sheet-form material may comprise sheet moulding compound (SMC).

Preferably the layer of sheet-form moulding material comprises SMC (sheet moulding compound). The SMC may comprise two main components: a matrix and a reinforcement.

The matrix preferably comprises a resin which preferably includes polyester, but may include vinyl ester, epoxy, phenolic, or a polyimide. Preferably the matrix comprises a thermosetting resin.

The matrix may further comprise additives, for example minerals, inert fillers, pigments, stabilizers, inhibitors, release agents, catalysts, thickeners, hydrating additives and/or other suitable materials.

The reinforcement preferably comprises glass fibres. The fibres may be cut, for example into lengths of 5 cm or less, or may be continuous. Other reinforcement materials could be used, for example carbon fibres.

There are benefits in using SMC. For example, SMC has low density but favourable mechanical properties compared with other materials for example thermoplastics and also exhibits good thermal properties. Of particular importance for some applications, for example building applications, resistance to fire is good. SMC also shows good noise reduction qualities, also important where used as a building material and good chemical resistance.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular, and may comprise a fabric, mat, felt or woven or other arrangement. The material may include short fibres. Fibres may provide a continuous filament winding. More than one layer of fibres may be provided.

The fibres may include one or more materials. For example the fibres may include one or more of carbon fibres, glass fibres, aramid fibres and/or polyethylene fibres. Kevlar® fibres may be used. Products including such fibres could be used for protective devices and building products. For example, some products of the present invention may find application as armoured or bullet-proof products. For example, protective panels may be formed having Kevlar® fibre reinforcement.

The sheet-form material may comprise an impregnated fibre composite material.

Surprisingly, it has been found that sheet-form materials including long fibres can be used in the methods of the present invention, and also sheet-form materials including fibres which are woven together can be used. Without wishing to be bound by theory, it is thought that such materials having relatively long fibre reinforcements and/or including fibre mats or other networks or structures can be used because the movement of material in the mould in a direction along the mould surface is relatively low.

Alternatively or in addition to reinforcement being provided as an integral part of the sheet-form material, reinforcement may be provided as a separate layer, for example arranged between the sheet-form material and the substrate.

Thus the arrangement may include sheet-form material having integral reinforcement, for example short fibres and/or longer fibres which may be arranged as fabrics or mats, for example. In addition, or alternatively, reinforcement may be provided as one or more layers separate from the sheet-form material. The additional layer of reinforcement may include short and/or long fibres, for example of materials mentioned above.

During the pressing or moulding, preferably the matrix material, for example resin, flows into the structure of the fabric of the printed sheet or other arrangement, to form a bond.

Preferably the layer of sheet-form material comprises a curable composition. In some examples of the invention, the sheet-form material might be settable other than by curing.

Preferably the pressure and heat is chosen such that the sheet-form material is moulded and then sets in the mould.

Preferably the viscosity of the sheet-form material is reduced during the pressing step.

Preferably the sheet-form material is one that reduces in viscosity and or at least partially liquefies on the application of heat and/or pressure. In this way, some flow of the material in the mould can be achieved. This can lead to improved moulding of the material, more uniform thickness and/or reduction of moulding defects. Preferably, the material at least partly flows into the printed sheet and/or cells of the substrate material during the pressing step. Preferably the material and substrate are such that the material only partly flows into the substrate during the moulding step so that good bonding between the skin and the substrate is obtained while retaining a suitable skin thickness for the required mechanical and other properties of the laminate.

Preferably the sheet-form material is applied as a single thickness.

Preferably the material, for example the SMC is applied to the mould in unfolded form. This leads to ease of manufacture, and also can reduce the pressure required for the moulding step. As discussed further herein, a plurality of single thickness layers may be provided, the layers preferably overlapping at the edges to reduce the risk of gaps being formed in the skin.

Preferably the sheet-form material is applied to substantially a whole mould surface.

Having the SMC extend substantially across the full area of a mould face has a number of advantages. For example, in some arrangements, the pressure required to complete the moulding step can be reduced by reducing the amount of lateral flow required of the material in the mould. By reducing the amount of flow of material across the mould surface, distortion and damage to the printed sheet can be reduced.

The sheet-form material can be applied to the mould as a single piece of material.

Preferably a plurality of sheets of sheet-form material is applied to a mould surface.

By providing the matrix in the form of a sheet, the use of liquid resin can be avoided. This can give considerable time savings in the manufacture of the product, as well as benefits regarding the ease of use of the matrix material and a reduction in the manpower and equipment required to apply the matrix material or pre-polymer to the mould.

In some examples, it is thought that the use of a veil or other sheet can have the effect of reducing movement of the matrix material in the plane of the mould. It is a preferred feature of the aspects of the present invention that the movement in the plane of the mould surfaces is reduced; it is thought that this gives better finish to the moulded products in some arrangements.

In some examples, the use of a veil or other sheet can have the effect of improving the surface finish of the composite product by retaining reinforcing fibres in the sheet-form material. In the absence of the veil or other sheet in some examples, such fibres can be seen to extend into the surface of the product, reducing its aesthetic qualities.

Preferably the configuration of the substrate is such that gas and/or vapour can be displaced from the pressing region where the surface of the substrate and the sheet-form material are being pressed together, preferably in the region of the interface of the substrate and the material.

By removing gas or vapour that might otherwise remain and/or build up in that region, it has been found that the pressure required to form the composite product can be significantly reduced in some examples.

Preferably the nature of the surface of the substrate is such that the gas or vapour can escape from the pressing region. For example, a region at at least a part of the surface of the material is preferably porous to allow for the displacement of gas or vapour from the relevant areas. Preferably the substrate is such that gas or vapour can escape from the pressing region in a direction having at least a component in a direction generally transverse to the pressing direction in which the sheet-form material is pressed to the substrate.

Other formations (as an alternative or in addition) may be provided to assist the displacement of the gas. For example, grooves or channels could be formed in the substrate.

The configuration of the substrate which allows for the displacement of the gas may be inherent in that it arises from the nature of the composition of the substrate itself, and/or it may be provided by subsequent action, for example by machining the substrate or by chemical action on the substrate. Preferably the configuration of the substrate is such that it can release pressure in the pressing region.

Preferably the substrate includes a material having a cellular structure, preferably open celled material.

A cellular structure of the substrate can provide the necessary displacement of the gases in some arrangements. In preferred examples, the substrate comprises a material including a substantially open-celled structure. In this way, good movement of the gases away from the pressing region can be obtained in some examples. The substrate may comprise a foam material.

The substrate may comprise a foam material including a substantially open-celled structure.

It is envisaged that the substrate might not form part of the ultimate product being formed. For example after the pressing step, part or substantially all of the substrate may be removed from the cured resin and printed sheet laminate. The laminate might then subsequently be used as a skin in the production of other products, for example the panels and doors described above. Where the curable material has passed into a surface of the substrate during moulding, the substrate into which the curable material has not permeated may be removed.

Preferably the substrate forms a part of a final product derived from the composite product.

Preferably, however, the substrate becomes bonded to the sheet-form material during the pressing. Preferably the moulding compound extends into the surface of the substrate during the pressing of the laminate so as to improve the mechanical bonding between the components. Alternatively, or in addition, an adhesive or other bonding agent may be used between the substrate and moulding compound layer.

By applying a sheet-form material to a substrate comprising an open-celled structure, several advantages can be achieved. In particular, by using an open cell foam substrate, air in the mould and gases produced during the moulding process can pass into and through the open cell structure of the foam so that the risk of the air and gases leading to flaws and other deformities in the skin are reduced.

Furthermore, by bonding the sheet-form material to the substrate and the printed sheet in the moulding process, efficiencies in manufacture of the laminate product can be achieved since in some examples, a further step to adhere the layers together might be avoided. In preferred examples, the material of the sheet-form material passes into the cells or other formations of the substrate material during the moulding process and provides a mechanical bond between the substrate and the moulded skin. This can reduce the risk of delamination of the skin from the substrate core, provide a stable product when exposed to heating/cooling cycles and provides a monolithic composite structure without the need for an adhesive to be applied or the assembly of parts.

In preferred examples, the sheet-form material forms a skin on the substrate, which is mechanically keyed into substrate giving a good bond between the skin and the substrate. In some cases it has been found that the bond achieved at the interface of the skin and the substrate is in fact stronger then the material of the substrate itself. A laminate product made by this method may fail within the substrate layer, and not at the interface.

The laminate product produced may comprise for example a core having one skin of SMC and patterned sheet applied to a surface, or may comprise a core sandwiched between two skins. Other arrangements are possible. In some cases, for example, the product may comprise a core having a first skin including SMC and an outer layer of the printed sheet, and a second skin including just the SMC layer and no printed sheet. This arrangement might be preferred where different finishes were required on different surfaces of the product, for example for use as cupboard doors.

The core having two skins might be formed in a single pressing operation in which the required layers were arranged and then pressed together in a mould to bond the layers together.

The method may include the step of providing a second layer including a sheet-form material, applying the second layer at a surface of the substrate, the substrate being sandwiched between the first and second layers of sheet-form material, and pressing the second layer and the substrate together.

In this way it can be seen how a two-sided panel or door can be formed in a single pressing operation. Alternatively, two or more steps might be used. A further layer of printed sheet can be provided at the second layer.

The components will be pressed together between suitable moulds or plates. In preferred examples, at least one mould part is provided which includes a pattern to be taken by the components during the pressing or moulding step.

For example, where the laminate product is to be a door, a mould surface might include for example recessed regions and other surface features so that the moulded door might look more realistic compared with a traditional wooden door.

It is envisaged that the methods of the present invention can be used to form products having no surface mouldings, for example flat panels. In this case, the substrate may comprise any suitable material. Preferably the substrate comprises a rigid material so that the pressing step can be carried out most successfully and the substrate can provide desired mechanical properties to the product. Such a method may for example be used to form flat-fronted panels or doors as well as other articles, for example table tops and kitchen worktops.

In some examples, where a contoured surface is required, the required contours or mouldings can be formed on the surface of the substrate. For example, the required shape may be formed in the substrate by machining, for example, a substrate block comprising polyurethane foam.

The shape of the mould is matched to the contours of the substrate so that when the components are pressed onto the mould surface, the resulting panel has the skin having the required contours bonded to the shaped substrate.

Preferably the substrate comprises a crushable material such that, during the application of pressure step, a surface of the substrate is moulded.

The substrate may comprise more than one material, for example the substrate may comprise regions of different materials or materials having different mechanical properties.

The substrate may comprise a frangible material. Such a material may be rigid and non-crushable in the normal use of the resulting product, but during the pressing step, the substrate material can be crushed to mould the substrate. Where a mould surface is used, the substrate material can be crushed so that its surfaces facing the mould conform to the contours of the mould surface.

This method is particularly advantageous in some examples. In particular, it can remove the requirement to machine the required contours into a surface of the substrate before the application of the skin.

Simple blocks of the substrate can be used in the method to form shaped or moulded products.

The moulding may provide surface contours of the product, and/or may provide the shape of the product itself. It is envisaged that shaped products could be formed using this method.

In examples described, the substrate comprises a plastics material, but other any other suitable material could be used.

It is envisaged that the invention might be applied where the substrate comprises a material which is rigid even on the application of pressure, but preferably the substrate comprises a material which can be controllably crushed during application of pressure so that a surface of the substrate can take on the contours of a part of the mould.

In this way, moulded laminated products can be efficiently produced in a single step from a sheet moulding material and a block of substrate material.

In examples of the present invention, the substrate material preferably comprises a rigid foam, for example a foam material obtained by causing or allowing a mixture of phenolic resole, acid hardener and finely divided particulate solid to cure under conditions in which foaming for the mixture is caused primarily or solely by volatilisation of small molecules present in the resole or formed as a by-product of the curing reaction. The formation of an example of such foams is described in detail in EP 0010353 and foamed bodies comprising these foams can be obtained as ACELL foam from Acell Holdings Limited, UK.

Preferably the substrate material has a density in the range of 100 to 500 kg/m3, more preferably 120 to 400 kg/m3 and most preferably 120 to 250 kg/m3. It has been found that such foams can be caused to reproduce on a face thereof the detail of even quite fine and complex mould surfaces by the application of a suitable pressure the level of which depends on the nature and density of the foam material but can readily be determined by simple experiment.

Such a substrate has a substantially open-cell structure so that as the layer of sheet-form material is pressed into the cells or pores of the material, the gas or vapour therein can be readily displaced.

While any suitable material may be employed, aspects of the invention are particularly suitable for use with substantially rigid structural materials, for example foams, that is, preferably self-supporting foams which are resistant to deflection under load and do not collapse under moderate pressure. The physical properties of such foams, especially the compressive strength and deflection under load are believed to be related to (amongst other factors) cell wall thickness. In some examples, the cell size for suitable substrate material is found to be in the range of about 0.5 mm to 5 mm, more preferably 0.5 or 1 mm to 2 or 3 mm.

It is preferred for the substrate to include a filler material, for example a finely divided filler material. Foamed phenolic resin reinforced with a finely divided filler is particularly preferred in some arrangements because of the excellent combination of physical properties and fire resistance that can be obtained for laminates formed from it.

Preferably at least some of the cells or pores of the foamed substrate are open to the surface of the face on which the layer of sheet-form material is to be applied, and preferably the open out below the surface to a greater width than the opening, thereby providing an undercut which can enhance the keying of the layer material to the substrate.

In some examples, the thickness of the layer of sheet-form material provided on the substrate will be at least 1 mm but thicknesses of less than 1 mm are also contemplated. If desired, the thickness of the layer of material may be reduced before or after setting.

In some examples a further layer of sheet-form moulding material is applied to an opposing surface of the substrate, the application of pressure sandwiching the substrate between the two layers of sheet-form material. In this case, a further patterned sheet layer or other layer may or may not be provided on the surface of the other layer of sheet-form material.

In this way, a laminate product including a skin on two sides can be formed. For example, were the product comprises a door, both sides of the door can be formed in a single step.

The substrate may include surface formations on at least a part of the substrate surface, so that the material of the sheet-form material keys with the formations to bond the material to the substrate.

Preferably the pressure applied is pressure is less than 200 tonnes, preferably less than about 100 tonnes.

As discussed above, traditional SMC manufacturing processes requires enormous pressure to evacuate the air trapped during the forming of the SMC product. By putting the foam substrate behind the SMC skin prior to pressing, the air can escape though the cellular structure of the foam reducing greatly the abrasion on the tool surface. Also considerably lower pressures are required. Preferably the pressure is less than 500 tonnes, preferably less than 200 tonnes, preferably less than about 100 tonnes.

Preferably the sheet-form material is applied to a mould surface comprising aluminium or aluminium alloy.

The invention also provides a method of moulding using a sheet-form material including a curable composition and a filler component, the method comprising applying a veil between the sheet moulding compound and a moulding surface.

Preferably the veil is printed.

A further aspect of the invention provides a method of moulding using a sheet-form material including a curable composition and a filler component, the method comprising applying a veil between the sheet moulding compound and a moulding surface. As discussed above, preferably the veil has the effect of a barrier to the filler component while allowing passage of the resin material, for example by absorption.

Preferably the method further includes the step of providing a veil between the sheet-form moulding material and a surface of the mould.

Preferably the veil comprises a sheet of material which is provided between the sheet-form moulding material and the mould surface before moulding. The provision of the veil preferably gives rise to improvements or changes in the surface finish of the moulded article compared with an arrangement in which the veil is not present.

For example, where the sheet of moulding compound comprises a reinforcing component, preferably the veil acts to prevent or reduce the amount of the reinforcing component at the surface of the resulting moulded product. For example, where the moulding compound comprises SMC including glass fibres, it has been found in some situations that the glass fibres on moulding can project from the surface of the moulded product giving a disadvantageous surface finish. By using a veil, it can be possible to provide a barrier to certain components of the moulding material, for example so as to improve surface finish.

The veil is preferably substantially pervious to a component of the moulding material during the moulding.

In this way, a component, for example a resin component, of the moulding material can pass through the veil during moulding so that a resin finish at the surface of the moulded product can be formed.

Therefore, the material for the veil is preferably chosen so that it is sufficiently pervious to certain components of the moulding compound (in particular the resin), while providing a barrier function for certain other components for example glass fibres or other reinforcements.

In some arrangements the veil can be placed directly adjacent to the mould surface and there will be sufficient penetration by the resin components for a satisfactory surface finish to be produced. However, it is envisaged that a further layer may be provided between the veil and the mould surface to improve the surface finish. For example a layer of resin material may be provided on the surface of the mould. This may be applied by any appropriate method.

Alternatively, or in addition, the veil layer may comprise additional components, for example resin material to improve surface finish.

The veil may comprise a non-woven material. In particular where the veil is applied directly to the mould, it may be desired for the veil material not to have a particular texture or finish, which might form a perceptible surface structure at the surface of the moulded product. However, in other arrangements, such a surface structure or pattern at the surface may be an advantageous feature.

Where such a structure is not desired, preferably the veil comprises a non-woven material. For example, preferably the veil does not comprise a knitted or woven surface, although in some cases such a material could be used, in particular if a surface treatment had been provided to reduce the surface structure of the veil material. For example, in some arrangements, the veil might comprise a fleece or brushed surface. However, for most applications, preferably at least one surface of the veil material has substantially no surface structure or pattern.

The veil may comprise a felt cloth. For example the veil may comprise a polyester material. Alternative materials could be used, for example comprising wool, polyethylene, polypropylene or PET. The veil might comprise a fleece material, or might comprise a foam material. As indicated above, a suitable material preferably is pervious to the resin to be used, and has a suitable surface texture.

Also provided by the invention is a composite product comprising a substrate and a skin of cured plastics material, further including a patterned sheet bonded in the surface of the skin.

Preferably the patterned sheet is substantially embedded in the surface of the skin.

In some arrangements it is preferred for the patterned sheet to be beneath the surface of the skin.

The skin preferably comprises a fibre reinforced plastics material.

The invention also provides a product formed by a method as described herein and an apparatus for use in a method as described herein.

Any feature in one aspect of the invention may be applied to other aspects of the invention, in any appropriate combination. In particular, method aspects may be applied to apparatus aspects, and vice versa.

Figure 1B:
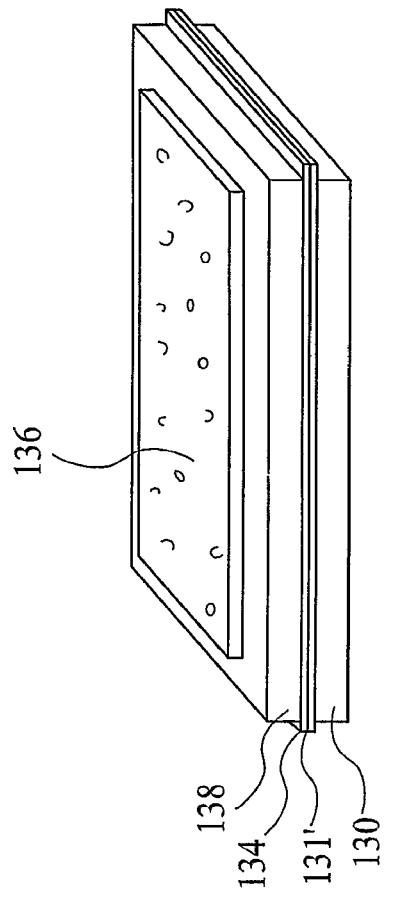
Figure 1C:
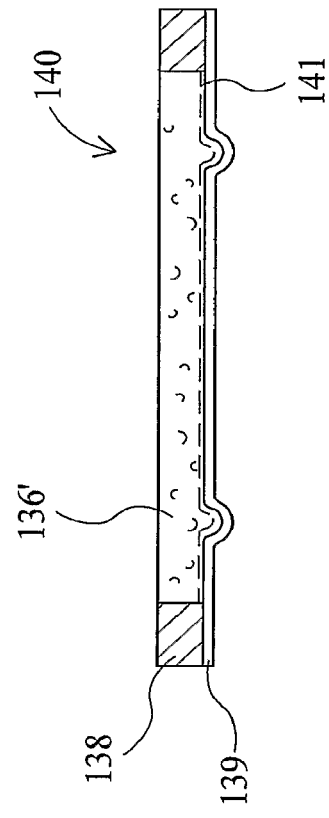

Preferred features of the present invention will now be described, purely by way of example, with reference to the accompanying drawings, in which:

FIG. 1a to c show an example of a method of forming a composite product.

In a method described in UK Patent Application No. 0719343.6, the skins are bonded directly to a foam core during a moulding step. A layer of sheet-form SMC is provided on the mould surface, a foam core is placed on the layer of SMC, and pressure is applied to mould the components together. During the moulding step, the core and SMC layer are moulded to the desired shape, and the SMC material becomes bonded to the core.

FIGS. 1a to c show an example of a method of forming a composite product. Here, a panel is being formed.

Figure 2:
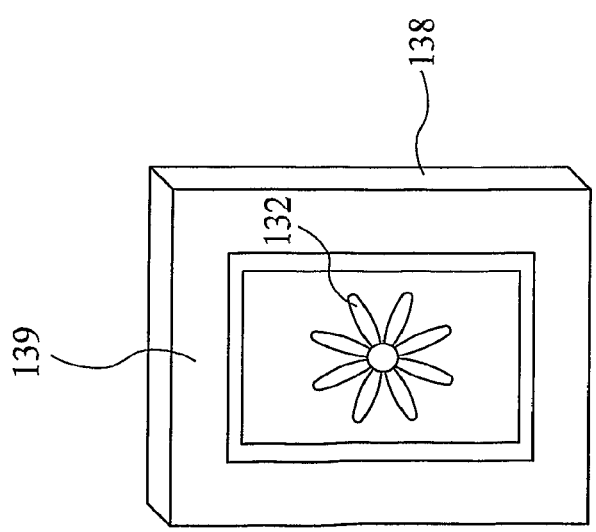

FIG. 2 shows the patterned composite product formed using the method shown in FIGS. 1a to c.

A lower mould 130 is provided which has a moulding surface having the required contours for forming the desired surface profile for the panel to be formed.

The lower mould is located at an assembly station and the elements of the panel to be formed are loaded onto the mould 130.

The moulding surface may first be cleaned using any suitable cleaning materials. The components to be moulded are then loaded onto the mould 130.

Immediately onto the moulding surface of the mould 130 is placed a printed sheet, here a glass veil 131. The veil 131 has a pattern 132 printed onto its surface. In this example, the veil 131 is sized so as to fit to the mould surface with little overlap, but the veil may be oversized, in which case trimming may be required after moulding.

Onto the veil 131 is placed a sheet of SMC 134. Again, in this example, the size of the sheet of SMC 134 is so that it is similar to that of the moulding surface, but the SMC sheet may be oversized in which case some finishing may be required after moulding.

A frame 138 is then placed onto the SMC 134 and a foam block 136 is inserted into the frame 138.

A perspective view of the assembled components is shown in FIG. 1b. In FIG. 1b, the thicknesses of the various components are not shown to scale, for clarity.

The mould 130 supporting the components is then placed onto a heated lower press platen in a press. In this example, the temperature of the lower platen is chosen so that the mould temperature during moulding is about 140 degrees C.

An upper platen is then lowered towards the lower platen in the press and pressure applied to effect the moulding operation and form the moulded composite product 140.

FIG. 1c shows schematically a cross sectional view of the resulting moulded composite product 140. For clarity, the relative thicknesses of the various components are not shown to scale. It is seen from FIG. 12c that a composite skin 139 has been formed on a surface of the product. The composite skin 139 comprises the cured SMC layer and also the veil 131 material. Inspection indicates that the resin of the SMC appears to have penetrated fully through the veil material to give a smooth glossy outer surface while the filler material in the SMC (for example the glass fibres) have been captured beneath the veil.

As shown in FIG. 2, the printed image 132 on the veil 131 can be seen clearly from the surface of the skin 139. The image originally provided on the veil 131 surface is seen to be essentially undistorted during the moulding operation. This is considered to be because there is little lateral flow of material across the mould face during the moulding step.

A boundary layer 141 is also seen between the composite skin 139 and the compressed foam core 136'. In this layer 141, the resin of the SMC appears to have penetrated the foam, for example by passing into the open cell structure of the foam core 136. This is seen to give good bonding between the composite skin 139 and the core 136'.

The composite product shown being formed in FIGS. 1a to c may be for example a precursor for a panel or door.

The finished panel or door may be formed by attaching two similar precursors together to give a double skinned panel or door. It will be seen that alternatively the panel or door might be made in a single moulding step.

For example, a layered product could be provided for moulding which comprised, on a lower moulding surface, a first veil, an SMC layer, a foam core (with any frame or other components required), a second SMC layer and second veil. An upper mould surface would be pressed onto the second veil and pressure applied to mould a full panel or door in one piece.

Without wishing to be bound by any particular theory, the veil can be provided as a barrier between the filler material and the product surface to improve the surface finish of the composite product in certain arrangements. It is also thought that the presence of a veil can reduce flow of the matrix material in the plane of the mould, thus improving the appearance and other features of the moulded product in some arrangements.

In the present example, the SMC includes glass fibres. The veil comprises a glass veil sheet.

It is to be noted that in some of the preferred examples, there is no requirement for the surface of the mould to be treated before the application of the components for moulding, for example the SMC, and veil if required. In particular, in some examples, there will be no requirement for the application of a dye to the mould, liquid resin, and/or other surface treatments. In many examples, any such components required may be included in the SMC material.

In other arrangements, the mould may be coated with a powder coating which then forms a coating on the product. This feature may be present in relation to any of the aspects of the invention. As an example, a powder coating can be applied electrostatically to the mould surface. Where the mould surface is heated, the powder coating melts or softens almost as soon as it is applied to the surface. For example the powder may include a polyester. The SMC or other matrix material (with or without integral reinforcing material) is then applied over the melted or softened powder coating. The melted or softened powder coating is then "sticky" on the surface of the mould and is thought to reduce movement of the matrix material during the moulding operation, which can in some cases give improved surface finish. In this example, the coating remains on the surface of the product, and provides a surface which is scratch and/or impact resistant. The powder coating can be coloured and thus provide a coloured coating to the product. The powder coating may be transparent or translucent and may have the appearance of a varnish on the surface of the product.

It will be understood that a very wide range of different composite products could be formed using methods as described herein. The application of the present invention is not restricted to the formation of, for example, doors It will be understood that a very wide range of different composite products could be formed using methods as described herein. The application of the present invention is not restricted to the formation of, for example, doors.

As discussed above, the image on the panel may be part of a larger image, and the composite products including the image elements may be joined or mounted together to form the larger image.

For example, the image elements may be printed onto one or more sheets of the veil material. The sheets may be cut where appropriate.

Data relating to the image elements required may be input into the printer and/or the printer software may be adapted to calculate the image element data in response to a command and information relating to the full image and the number and configuration of the elements required.

Preferably the printer used is a digital printer allowing for fast changing of images on the printing line.

It is envisaged that bespoke images can be printed for particular composite products. For example, a door made to order may have a particular door number printed onto the patterned veil, the door number being visible on the finished door.

It will be appreciated that a wide number of images, text, patterns can be applied to composite products in this way.

Example of Preparation of SMC

The SMC comprises a curable matrix and reinforcement.

To prepare the SMC, the matrix is prepared by mixing, for example a polyester resin with minerals and additives, for example including calcium carbonate and titanium dioxide together with appropriate pigments.

The matrix in the form of the resin paste is then applied to a bottom film carrier. Glass fibres as the reinforcement are then applied to the upper surface of the resin paste on the film carrier. A further layer of the resin paste is applied to sandwich the fibres between the layers of matrix. A top film is applied to the upper layer of the matrix. The resulting layered composition is subsequently compressed using a series of rollers to form a sheet of the sheet moulding compound between the film carriers. The material is rolled onto rollers and kept for at least 3 days at a regulated temperature of for example 23 to 27 degrees C. The resulting SMC can be compression moulded with heat. The shelf life of the SMC before use is usually a few weeks.

Foam

In some examples of the invention, the substrate comprises a foam having frangible cell walls. Preferably this term includes a foam for which under compression the foam crumbles by brittle fracture of the cell walls e.g. involving a clean fracture of the cell walls. Such a foam can retain a clear and substantially dimensionally accurate imprint in the crushed zone of an object through which the compressive force is applied. In general, it is preferred that the yield strength of the foam, which in this case means the minimum force required to cause the fracture of the cell walls and for the foam to crumble, is in the range of about 100 to 140 KPa (15 to 20 lbs/sq.in) more preferably at least 200 KPa (30 lbs/sq.in), since this provides useful impact resistance. In general, for a given foam composition, the greater the density, the greater the yield strength.

By using a substantially rigid plastics foam with frangible cell walls, mouldings with depressed zones of moulding detail can be readily formed by applying a layer to the foam core with sufficient pressure to cause the cell walls of the foam in the areas behind the depressed zones of the skin to be fractured whereby the foam is caused to conform to the contours of the skin in those zones by controlled localised crushing. Thus, air gaps between the skin and the substrate can be avoided and it is not necessary to pre-form the substrate in the form of complicated shapes. This is particularly advantageous since the presence of such air gaps in prior art products has in some cases contributed to their inability to resist changes in temperature.

For such a method, it is advantageous to use an open cell foam having frangible walls as pressing into a conventional foamed core such as of polystyrene is in some cases not successfully achieved because the resilience of the foam may cause distortion of the skins when the pressure is released.

In some examples of the invention, plastics foam are preferred which are substantially open-cell and rigid. However, the foam is advantageously selected to be of a high density relative to the foamed polystyrene conventionally used, e.g. a density of 75 kg/m$^3$ or above, since this gives a better feel to the panel and makes it sound and handle more like a conventional wooden panel. However, foams having lower densities may also be selected. Where a higher density is desirable, the foam may contain a filler, more preferably a finely divided inert and preferably inorganic solid. The filler may be selected such that it contributes to the panels ability to resist changes in temperature. In a particularly preferred embodiment, the filler is capable of absorbing moisture, e.g. as water of crystallisation.

While particular reference is made in the examples to open celled frangible foams, any suitable foam may be used. In some examples of the invention, foams which are substantially open cell are preferred; for example, a polyurethane foam, but in some examples the foam might not be open celled. Preferably in such example, the structure of the substrate is such that gases can be released from the mould. Where the foam is open celled, a foam that has an open-cell configuration at production is particularly suitable. A foam that also has frangible cell walls is particularly preferred where the panel or other product to be formed has depressed areas, such as to provide a moulding effect. However, as described herein, the moulding of the substrate can be provided by other methods, for example machining.

Any foam can be used for some aspects of the invention. In many examples, rigid foam materials are preferred. For example a rigid foam could be used to form a panel having a substantially flat (unmoulded) surface which may or may not include surface pattern as described herein.

Alternatively, or in addition, the surface of the foam may be contoured. The contours could for example be formed on the surface of a foam block, for example by machining or any other suitable method. In such cases, the foam need not for example be a frangible or compressible foam.

Where a foam having frangible cell walls is used, the cell wall will fracture as pressure is placed on the foam by the application of the depressed areas of the mould. This localised increase in pressure will increase the pressure inside the cell, which will cause the gases to travel through the foam, and the cell to collapse thereby accommodating the depressed area of the skin.

One suitable foam is a rigid filled phenolic foam. One particularly suitable foam is that produced by effecting a curing reaction between:

(a) a liquid phenolic resole having a reactivity number (as defined below) of at least 1 and (b) a strong acid hardener for the resole, in the presence of:

(c) a finely divided inert and insoluble particulate solid which is present in an amount of at least 5% by weight of the liquid resole and is substantially uniformly dispersed through the mixture containing resole and hardener; the temperature of the mixture containing resole and hardener due to applied heat not exceeding 85 C and the said temperature and the concentration of the acid hardener being such that compounds generated as by-products of the curing reaction are volatilised within the mixture before the mixture sets whereby a foamed phenolic resin product is produced.

By a phenolic resole is meant a solution in a suitable solvent of the acid-curable prepolymer composition obtained by condensing, usually in the presence of an alkaline catalyst such as sodium hydroxide, at least one phenolic compound with at least one aldehyde, in well-known manner. Examples of phenols that may be employed are phenol itself and substituted, usually alkyl substituted, derivatives thereof provided that the three positions on the phenolic benzene ring o- and p- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required but the cured products will be less highly cross-linked. However, in general, the phenol will be comprised mainly or entirely of phenol itself, for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active H atoms (dihydric compound) that will react with the phenol/aldehyde reaction product of the resole during the curing step to reduce the density of cross-linking. Preferred dihydric compounds are diols, especially alkylene diols or diols in which the chain of atoms between the OH groups contains not only methylene and/or alkyl-substituted methylene groups but also one or more hetero atoms, especially oxygen atoms, e.g. ethylene glycol, propylene glycol, propane-1,3-diol, butane-1,4-diol and neopentyl glycol. Particularly preferred diols are poly-, especially di-, (alkylene ether) diols e.g. diethylene glycol and, especially, dipropylene glycol. Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2-6 atoms between OH groups.

The resole may comprise a solution of the phenol/aldehyde reaction product in water or in any other suitable solvent or in a solvent mixture, which may or may not include water. Where water is used as the sole solvent, it is preferred to be present in an amount of from 15 to 35% by weight of the resole, preferably 20 to 30%. Of course the water content may be substantially less if it is used in conjunction with a cosolvent. e.g. an alcohol or one of the above-mentioned dihydric compounds where one is used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66-67% aqueous solution of p-toluene sulfonic acid at 60 degreesC. The test involves mixing about 5 ml of the resole with the stated amount of the p-toluene sulfonic acid solution in a test tube, immersing the test tube in a water bath heated to 60 degrees C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable.

The preferred hardeners for the process of the invention are the aromatic sulfonic acids, especially toluene sulfonic acids.

The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5-20 poises. Below 5 Poises, the amount of solvent present tends to present difficulties during the curing reaction.

The curing reaction is exothermic and will therefore of itself cause the temperature of the mixture containing resole and acid hardener to be raised. The temperature of the mixture may also be raised by applied heat but the temperature to which said mixture may then be raised (that is, excluding the effect of any exotherm) must not exceed 85 degrees C.

If the temperature of the mixture exceeds 85 degrees C. before addition of the hardener, it is difficult or impossible thereafter to properly disperse the hardener through the mixture because of incipient curing. On the other hand, it is difficult, if not impossible, to uniformly heat the mixture above 85 degrees C. after addition of the hardener.

Increasing the temperature towards 85 degrees C. tends to lead to coarseness and non-uniformity of the texture of the foam but this can be offset at least to some extent at moderate temperatures by reducing the concentration of hardener. However at temperatures much above 75 degrees C. even the minimum amount of hardener required to cause the composition to set is generally too much to avoid these disadvantages. Thus, temperatures above 75 degrees C. are preferably avoided and preferred temperatures for most applications are from ambient temperature to about 75 degrees C. The preferred temperature range appears to depend to some extent on the nature of the solid (c). For most solids it is from 25 to 65 degrees C. but for some solids, in particular wood flour and grain flour, the preferred range is 25 to 75 degrees C. The most preferred temperature range is 30 to 50 degrees C. Temperatures below ambient, e.g. down to 10 degrees C. can be used, if desired, but no advantage is gained thereby. In general, at temperatures up to 75 degrees C., increase in temperature leads to decrease in the density of the foam and vice versa.

The amount of hardener present also affects the nature of the product as well as the rate of hardening. Thus, increasing the amount of hardener not only has the effect of reducing the time required to harden the composition but above a certain level dependant on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of chosen hardener required to give substantially the same setting time as the stated amount of p-toluene sulfonic acid. The most suitable amount for any given temperature and combination of resole and finely divided solid is readily determinable by simple experiment. Where the preferred temperature range is 25-75 degrees C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25 degrees C. or resoles having a reactivity number below 10, it may be necessary to use more hardener.

It may be necessary to make some adjustment of the hardener composition in accordance with the nature, especially shape and size, of the mould and this can be established by experiment.

By suitable control of the temperature and of the hardener concentration, the time lapse between adding the hardener to the resole and the composition becoming hard (referred to herein as the setting time) can be varied at will from a few seconds to up to an hour or even more, without substantially affecting the density and cell structure of the product.

Another factor that controls the amount of hardener required can be the nature of the inert solid. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily $CH_2O$ and/or $H_2O$, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. The phenomenon may be similar to that of froth flotation employed in the concentration of low grade ores in metallurgy. In any event, the presence of the solid is essential to the formation of the product. To achieve the desired effect, the solid should be present in an amount of not less than 5% by weight based on the weight of the resole.

Any finely divided particulate solid that is insoluble in the reaction mixture is suitable, provided it is inert. The fillers may be organic or inorganic (including metallic), and crystalline or amorphous. Even fibrous solids have been found to be effective, although not preferred. Examples include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

One preferred class of solids is the hydraulic cements, e.g. gypsum and plaster, but not Portland cement because of its alkalinity. These solids will tend to react with water present in the reaction mixture to produce a hardened skeletal structure within the cured resin product. Moreover, the reaction with the water is also exothermic and assists in the foaming and curing reaction. Foamed products obtained using these materials have particularly valuable physical properties. Moreover, when exposed to flame even for long periods of time they tend to char to a brick-like consistency that is still strong and capable of supporting loads. The products also have excellent thermal insulation and energy absorption properties. The preferred amount of inert particulate solid is from 20 to 200 parts by weight per 100 parts by weight of resole.

Another class of solids that is preferred because its use yields products having properties similar to those obtained using hydraulic cements comprises talc and fly ash. The preferred amounts of these solids are also 20 to 200 parts by weight per 100 parts by weight of resole.

For the above classes of solid, the most preferred range is 50 to 150 parts per 100 parts of resole.

Thixotropic foam-forming mixtures can be obtained if a very finely divided solid such as Aerosil (finely divided silica) is included.

If a finely divided metal powder is included, electrically conducting properties can be obtained. The metal powder is preferably used in amounts of from 50 to 250 parts per 100 parts by weight of resole.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

In general, it is preferred to use the fibrous solids only in conjunction with a non-fibrous solid since otherwise the foam texture tends to be poorer.

Other additives may be included in the foam-forming mixture; e.g. surfactants, such as anionic materials e.g. sodium salts of long chain alkyl benzene sulfonic acids, non-ionic materials such as those based on poly(ethylene oxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols.

Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc.

Conventional blowing agents may also be included to enhance the foaming reaction, e.g. low boiling organic compounds or compounds which decompose or react to produce gases.

The foam-forming compositions may also contain dehydrators, if desired.

A preferred method of forming the foam-forming composition comprises first mixing the resole and inert filler to obtain a substantially uniform dispersion of the filler in the resole, and thereafter adding the hardener. Uniform distribution of both the filler and the hardener throughout the composition is essential for the production of uniformly textured foam products and therefore thorough mixing is required.

If it is desired that the composition is at elevated temperature prior to commencement of the exothermic reaction, this can be achieved by heating the resole or first mixing the resole and the solid and then heating the mixture. Preferably the solid is added to the resole just before the addition of the hardener. Alternatively, the mixture of resole, solid and hardener may be prepared and the whole mixture then heated, e.g. by short wave irradiation, preferably after it has been charged to a mould. A conventional radiant heat oven may also be used, if desired, but it is difficult to achieve uniform heating of the mixture by this means.

Preferably, the foam has a density in the range 75 to 500 $kg/m^3$, more preferably 100 to 400 $kg/m^3$ and most preferably 100 to 250 $kg/m^3$. Foam cell size is also important because up to a limit the larger the size of the cell for a given density, the thicker will be the walls and hence the greater the physical strength of the foam. However if the cell size is too large, the strength begins to suffer. Preferably, the cell size is in the range of 1 to 3 mm.

It will be understood that the present invention has been described above purely by way of example, and modification of detail can be made within the scope of the invention.

In particular, the examples above have been described in relation to the manufacture of panels, in particular the manufacture of doors. However, it should be appreciated that the invention has very wide application including other products. Indeed it is envisaged that an extremely wide range of products could be made in accordance with methods of the present invention. Many moulded products could be made using the methods of the present invention, even where those products may be manufactured using different materials (for example wood, metal, porcelain) at present. In addition to building products, it is envisaged that for example, the invention could find application to vehicle parts and fittings, casings for electrical equipment and many household items of which furniture, picture frames, chairs, tables, lamp bases, vases, bowls are only a few examples.

The methods described may, for example, be used to produce products for sports, or other leisure activities. For example, methods described might be used for forming rackets, bats, or other products, for example skis. Products made by the methods may find application for example in the aerospace, aircraft or other vehicle fields. For example, the methods described could be used to form panels for use in aircraft skins and/or as internal panels in the aircraft. The products might find application as blades, for example for wind turbines.

Each feature disclosed in the description, and (where appropriate) the claims and drawings may be provided independently or in any appropriate combination.

The invention claimed is:

1. A composite product comprising a substrate having a substantially open-celled structure and a skin of cured plastics material, wherein the composite product further comprises a patterned sheet bonded by and at least to the surface of the skin and wherein the patterned sheet is substantially embedded in the skin.

2. The composite of claim 1, wherein the patterned sheet is bonded at least partially within the surface of the skin.

3. The composite of claim 1, wherein the patterned sheet is bonded within the surface of the skin.

4. The composite of claim 1, wherein the patterned sheet is formed from material of fabric.

5. The composite of claim 1, wherein the patterned sheet comprises a non-woven material.

6. The composite of claim 1, wherein the patterned sheet comprises a glass veil.

7. The composite of claim 1, wherein the patterned sheet has a weight of less than 200 $g/m^2$.

8. The composite of claim 1, wherein the patterned sheet is printed.

9. The composite of claim 8, wherein the patterned sheet is a screen-printed patterned sheet, an offset printed pattern sheet or and inkjet printed pattern sheet.

10. The composite of claim 1, wherein the patterned sheet provides a surface texture to the composite.

11. The composite of claim 1, wherein the skin of cured plastic material includes a thermosetting material.

12. The composite of claim 1, wherein the skin of cured plastic material includes reinforcing fibers.

13. The composite of claim 1, wherein the skin of cured plastic material comprises sheet molding compound (SMC) or a phenolic material.

14. The composite of claim 1, wherein the skin of cured plastic material includes an impregnated fiber composite material.

15. The composite of claim 1, wherein the substrate comprises an open-celled foam.

16. The composite of claim 15, wherein the open-celled foam is frangible.

17. The composite of claim 15, wherein the open-celled foam is a phenolic open-celled foam.

18. A household item formed from a composite comprising a substrate having a substantially open-celled structure and a skin of cured plastics material, wherein the composite product further comprises a patterned sheet bonded by and at least to the surface of the skin and wherein the patterned sheet is substantially embedded in the skin.

19. A vehicle fitting formed from a composite comprising a substrate having a substantially open-celled structure and a skin of cured plastics material, wherein the composite product further comprises a patterned sheet bonded by and at least to the surface of the skin and wherein the patterned sheet is substantially embedded in the skin.

* * * * *